United States Patent [19]

Kanamaru et al.

[11] Patent Number: 4,843,484
[45] Date of Patent: Jun. 27, 1989

[54] INFORMATION RECORDING DISC WITH COMPOSITE INDEX CODES AND ITS PLAYBACK METHOD

[75] Inventors: Hitoshi Kanamaru; Tsuyoshi Watanabe; Takahumi Shiba; Shoichi Katagiri, all of Tokorozawa, Japan

[73] Assignee: Pioneer Electronic Corporation, Tokyo, Japan

[21] Appl. No.: 63,439

[22] Filed: Jun. 18, 1987

[30] Foreign Application Priority Data

Sep. 12, 1986 [JP] Japan .............................. 61-216800
Sep. 12, 1986 [JP] Japan .............................. 61-216801

[51] Int. Cl.$^4$ ............................................. H04N 5/76
[52] U.S. Cl. .................................. 358/342; 360/72.1; 369/54
[58] Field of Search ............... 358/342, 343; 360/72.1, 360/72.2; 369/54, 57

[56] References Cited

U.S. PATENT DOCUMENTS 4,660,100  4/1987  Sugiyama et al. .................. 358/342
4,680,647  7/1987  Moriyama .......................... 358/343

Primary Examiner—L. T. Hix
Assistant Examiner—D. Rutledge
Attorney, Agent, or Firm—Fleit, Jacobson, Cohn & Price

[57] ABSTRACT

An information recording disc having a first recording area carrying a digital signal, a second recording area carrying a frequency modulated video signal and a superimposed digital signal, the first and second recording areas respectively having a lead-in area in which index codes relating to the contents of each recording area and including identification information indicating the recording area to which each index code belongs are recorded mixedly. In playing such a recording disc, index codes read from the lead-in area are classified according to the recording area to which each index code belongs, and stored in corresponding memory areas of a memory device, so that the index codes stored in the memory area corresponding to a designated recording area can be retrieved in a short time for playing information, and the playing operation is controlled by using the retrieved index codes.

4 Claims, 7 Drawing Sheets

PLAYING DIRECTION

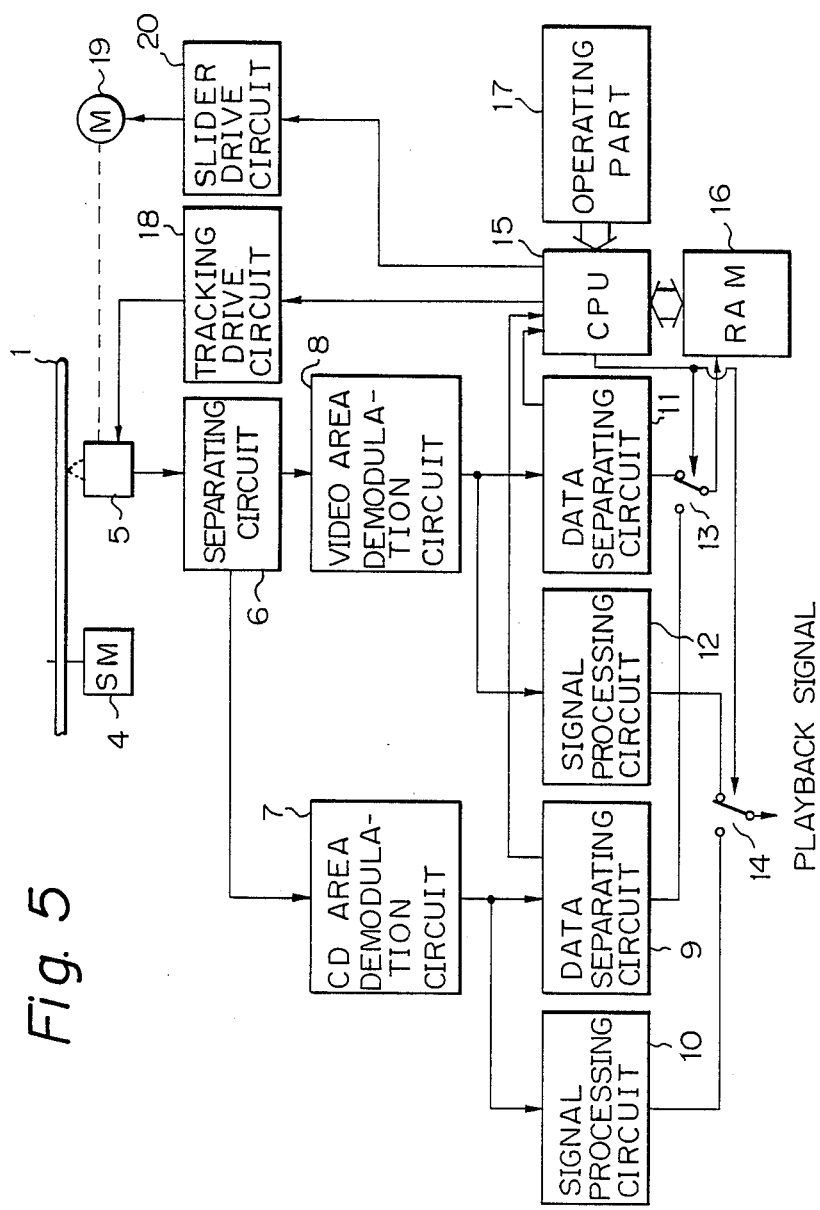

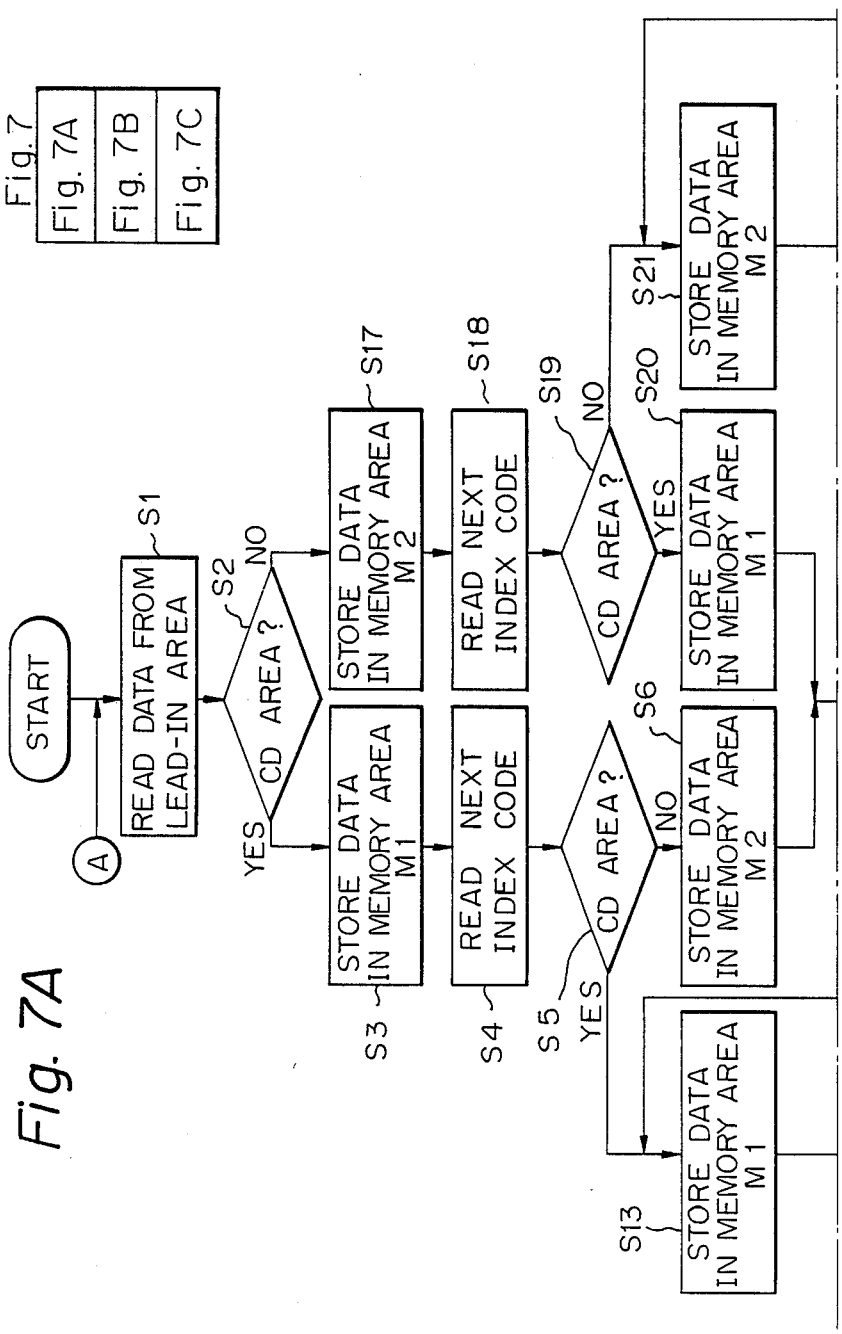

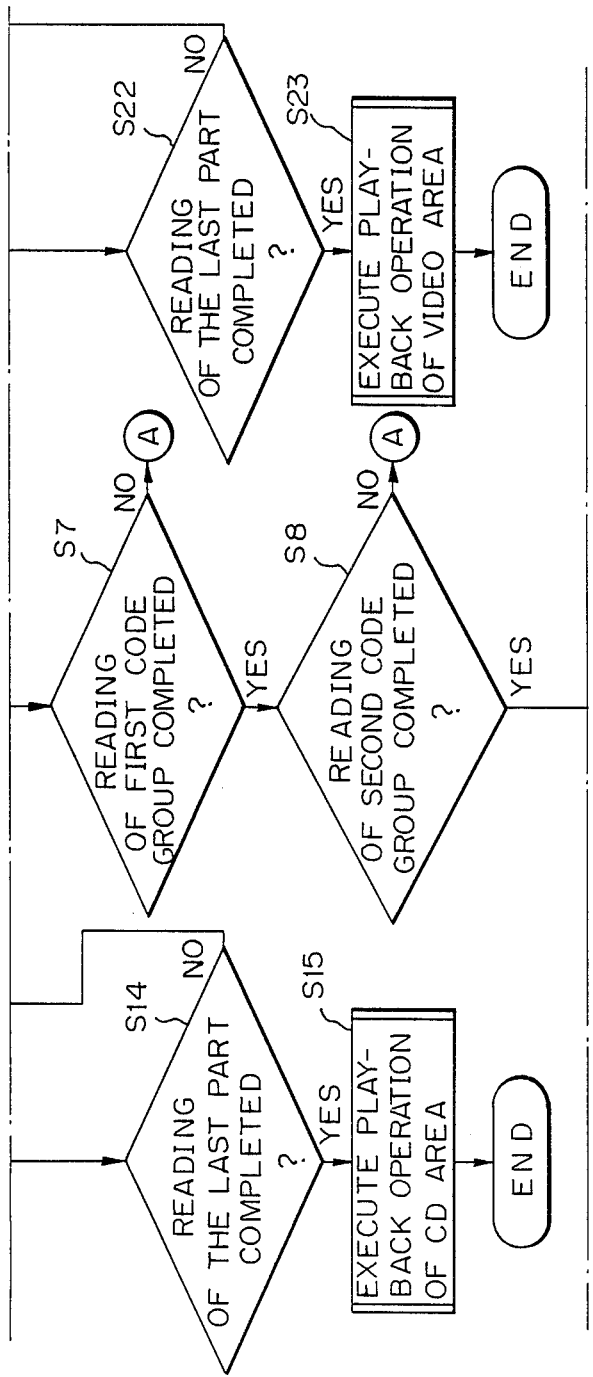

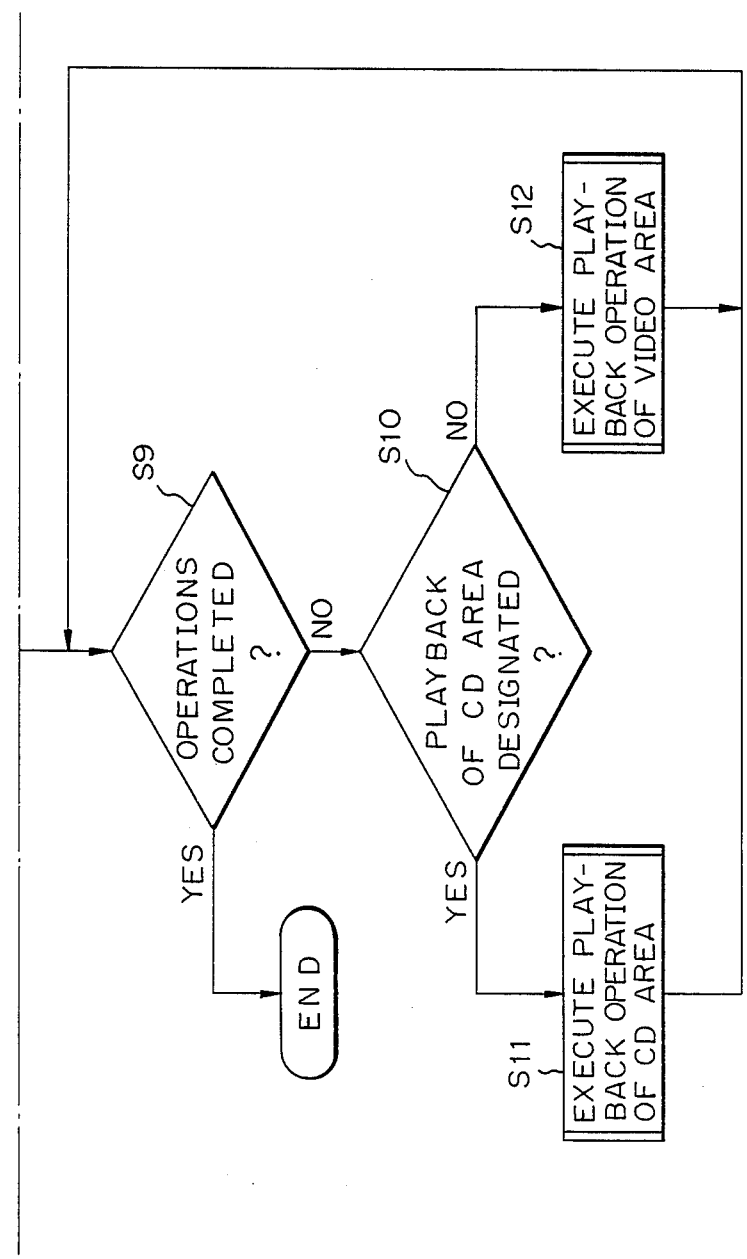

INFORMATION RECORDING DISC WITH COMPOSITE INDEX CODES AND ITS PLAYBACK METHOD

BACKGROUND OF THE INVENTION

1. Field of the Invention

The present invention relates to a recording disc and a method for playback of the data recording disc, and in particular to a recording disc (referred to hereinafter simply as a disc) having index codes recorded repetitively in lead-in area thereof and its playback method.

2. Description of Background Information

Small-diameter audio discs having a diameter of approximately 12 cm and having digital signals recorded thereon, generally called "compact discs" or CDs, are now well known. However, in recent years another type of disc, referred to in the following as a composite disc, has been developed, having an area in which is recorded an FM modulated video signal with a PCM signal superimposed thereon, as well as an area having only a PCM signal recorded.

With such a composite disc, the area having only PCM data recorded, e.g. audio data in PCM form, may for example be disposed in an inner peripheral area of the disc, (this area being referred to hereinafter as the CD area), while the area containing the FM video signal with superimposed PCM signal (this area being referred to hereinafter as the video area) may be disposed peripherally outward from the CD area, separated therefrom by a predetermined radial distance.

Furthermore, with a compact disc, index codes which relate to the recorded contents are provided in the lead-in area, thus enabling special playback operations such as the program search operation or the program skip operation. The index codes indicate such information as the number of recorded programs (or tracks), total playback time, and playback time of each track. When the playing of the disc starts, the information recorded in the lead-in area is read out before the playback of the information of each track begins. Therefore, also in the composite disc, the index codes are to be recorded in the lead-in area so that special playback mode operations becomes possible.

However, with the composite disc, the recording area is divided into two areas, and a lead-in area is provided for each of the two recording areas. Therefore, different two sorts of index codes should be provided correspondingly to two recording areas which carry different sort of information. With respect to such two sorts of index codes, each sort of index code has to be recorded, as well as in the corresponding recording area, in the other recording area so that any of the special playback mode operations can be performed throughout the different two recording areas. In recording these two sorts of index codes in the same lead-in area, it is desirable to adopt a recording method which is sufficiently efficient in view of various playback operations. Furthermore, in determining the playing method for playing a recording disc on which two sorts of index codes are recorded mixedly in a single lead-in area, it is desirable that the efficiency of the playback operation will not be negatively affected by the necessity for reading different two sorts of index codes recorded on the recording disc.

OBJECT AND SUMMARY OF THE INVENTION

The present invention has been made in light of the above need, and an object of the present invention is therefore to provide a recording disc with composite index codes in which two sorts of index codes corresponding to two different recording areas are recorded by a recording method which is efficient with regard to the playback operation.

Another object of the present invention is to provide a method for playing a recording disc with composite index codes in which different two sorts of index codes are recorded mixedly in a single lead-in area, which method is efficient enough in playing operations.

According to the present invention, a recording disc with composite index codes includes at least in one side thereof a first recording area having only digital data, e.g. audio data in PCM form, and a second recording area containing the FM video signal with superimposed digital signal, the first and second recording areas having lead-in areas respectively, in which first and second groups of index codes each composed of a repetition of index codes relating respectively to the recorded contents of each area, are recorded together. The index codes in each index code group are provided with identification information indicative of the recording area to which they belong, and the index codes of different index code groups are mixed with each other in each lead-in area.

According to another aspect of the present invention, a method for playing a recording disc with composite index codes includes a step for reading index codes of first and second index code groups from a lead-in area of the recording disc, a step for classifying the read-out index code data and storing index code data of the first index code group in a first memory area of a memory device and storing the index code data of the second index code group in a second memory area of the memory device. At the time of playing information recorded in the recording disc, the memory area corresponding to the recording area of the recording disc to be played back is selected, and the playing operation of the player is controlled in accordance with the contents memorized in the selected memory area.

BRIEF DESCRIPTION OF THE DRAWINGS

FIG. 5 is an example of a recording disc player for playing the composite disc, in which the playing method of the invention is adopted;

Fig. 7 is a flowchart showing the steps of playing process in the method for playing the composite disc according to the present invention.

DETAILED DESCRIPTION OF PREFERRED EMBODIMENTS

The embodiment of the present invention will be described with reference to the accompanying drawings hereinafter.

Figure 1:
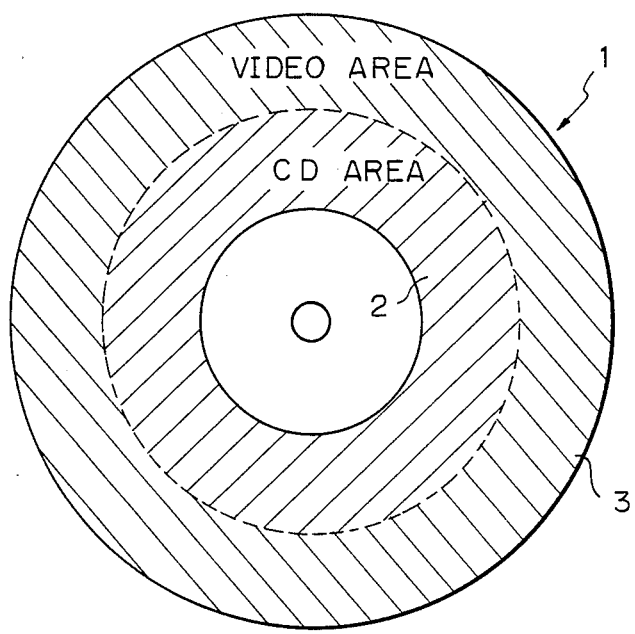
Fig. 1 is a diagram schematically showing the division of the recording area in the composite disc.
Figure 2:
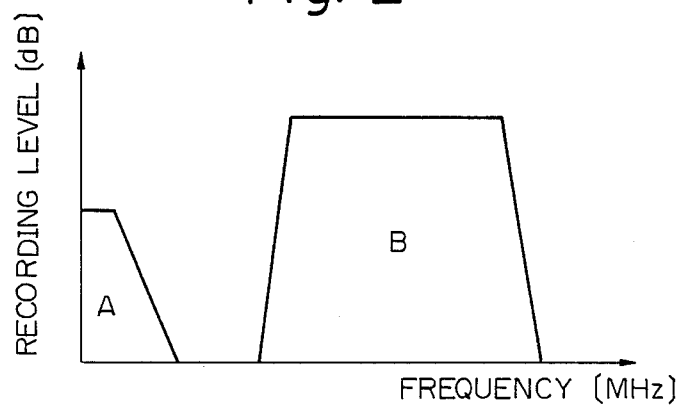
Fig. 2 is a diagram showing a frequency spectrum of the signal recorded in the video area of the composite disc.
Figure 3:
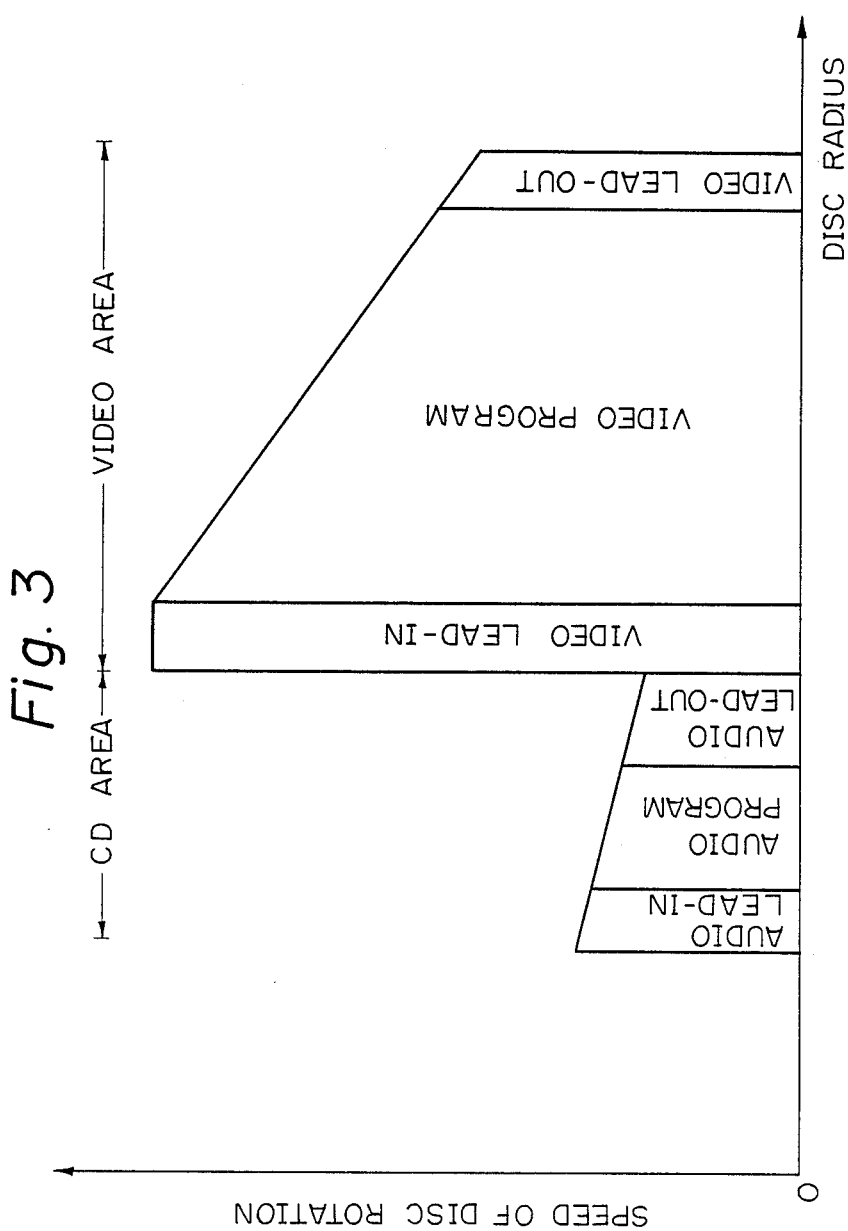
Fig. 3 is a diagram also showing the division of the recording area in the composite disc, in which the arrangement of recording information is illustrated.

A composite disc shown in FIG. 1 has a first area 2 disposed in an inner peripheral area of the disc (this area being referred to hereinafter as the CD area) in which are recorded audio data in PCM form, and a second area 3 (this area being referred to hereinafter as the video area) in which is recorded an FM modulated video signal with a PCM signal superimposed thereon. A video signal contains higher frequency components than those of the PCM signal. Therefore, the spectrum of the signals recorded in the video area will be as shown in FIG. 2, in which A denotes the PCM signal frequency components, and B denotes the video FM signal frequency components. At the time of recording the video area signal, the speed of rotation of the disc must be made higher than that used during recording of the CD area 2, and therefore of course during playback it is necessary to rotate the disc at a higher speed during video area 3 playback than during playback of the CD area 2. As shown in FIG. 3, the speed of disc rotation during playback of the CD area 2 is several hundred r.p.m., whereas during video area 3 playback the speed of rotation is two thousand plus several hundred r.p.m. for playback from the innermost periphery of that area, and is one thousand plus several hundred r.p.m. for playback from the outermost periphery of that area.

At the head of the CD area 2 and the video area 3, there respectively are provided lead-in areas in which are provided first and second index code groups, each of which is, correspondingly to each recording area, made up of a repetition of index codes indicating information such as starting and end times of each small sections (tracks) forming respective recording areas. The index code groups are formed by repeating the index codes so that, even if the reading of the index codes from a certain recording area becomes difficult because of the dropout for example, the reading of the index codes from another recording area is possible.

As a method for recording the index codes in the lead-in area, it is conceivable to record the first index code group corresponding to the CD area 2 at first, and record the second index code group corresponding to the video area 3 subsequently. However, in playing back a recording disc on which the index codes are recorded in such a manner, if the index codes corresponding to the CD area 2 is greater in number than the index codes corresponding to the video area 3, the rise time of the playing operation by the player may become long because of the time required before the reading of the index codes corresponding to the video area 3.

Figure 4:
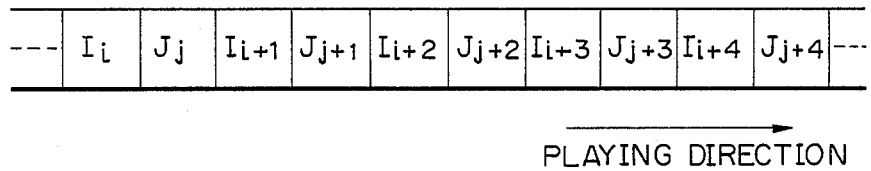
Fig. 4 is a diagram showing a method for recording the index codes in a lead-in area of the composite disc according to the present invention.

Therefore, according to the present invention, each index code of the first and second index code groups is provided with identification information indicating the area (CD area/video area) to which it belongs. Furthermore, the index codes of different code groups are recorded in a lead-in area alternately for example, so that index codes of both index code groups are mixed with each other in the same lead-in area. In FIG. 4, the index codes of the CD area 2 are denoted by the letter I and the index codes of the video area 3 are denoted by the letter J, and the subscription of a small letter indicates the order of the index codes. As shown, the index codes of the CD area 2 and the index codes of the video area 3 are recorded alternately in order. In FIG. 4, the index codes of each area are denoted by the letters I and J for the purpose of simplification. However, in practice the identification information included in each index code for indicating the area to which itself belongs is such as the numeral "1" (expressed as 0001 in digital form) for the index codes of the CD area 2, and the numeral "4" (expressed as 0100 in digital form) for the index codes of the video area 3.

Then, the structure of a player for playing back such a recording disc with composite index codes will be explained with reference to FIG. 5.

In FIG. 5, the disc 1 is rotated by a spindle motor 4. The information recorded on the disc 1 is read-out by an optical pickup 5. The optical pickup 5 incorporates therein various elements such as an optical unit including a laser diode as a light source and an objective lens, a photo detector for receiving a reflection light from the disc 1, and a focus actuator for positioning the objective lens with respect to an information recording surface of the recording disc 1, and a tracking actuator for positioning the spot of the light beam radiated from the pickup 5 in a radial direction of the disc 1 with respect to recording tracks in the form of series of pits.

An Rf signal from the pickup 5 obtained by reading the CD area 2 and the video area 3 is supplied to a CD area demodulation circuit 7 and a video area demodulation circuit 8 after passing through a separating circuit 6. A demodulation output signal of the CD area demodulation circuit 7 is supplied to a data separation circuit 9 wherein the index code data recorded in the lead-in area is separated, and also supplied to a signal processing circuit 10 where a predetermined signal processing operation is performed, to provide a playback signal. Similarly, a demodulation output signal of the video area demodulation circuit 8 is supplied to a data separation circuit 11, where the index code data recorded in the lead-in area is separated, and supplied to a signal processing circuit 12 in which a predetermined signal processing is perfomed, to provide an output signal.

Figure 6:
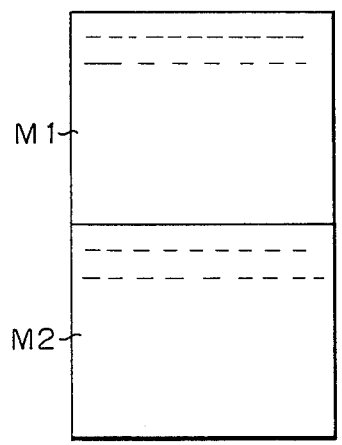
Fig. 6 is a diagram showing the division of the memory areas in the RAM used in the player shown in Fig. 5.

The change-over switch 13 and 14 are operated by means of a CPU (Central Processing Unit) 15 depending on the playback area. The change-over switch 13 transmits the index code data which are separated at data separating circuits 9 and 11 to a RAM (Random Access Memory) 16 in alternative way. On the other hand, the change-over switch 14 transmits, as a playback signal, output signals of signal processing circuits 10 and 12 in alternative way to the outside. The data separating circuits 9 and 11 detect the identification information contained in the index code data while separating the index code data recorded in the lead-in area. Further, the data separating circuits 9 and 11 transmits to the CPU 15 an identification signal indicating as to whether the index code data being separated is data corresponding to the recorded contents of the CD area 2 (data of the first index code group) or to the recorded contents of the video area 3 (data of the second index code group). As shown in FIG. 6, the memory area of the RAM 16 is divided into two areas M1 and M2, and the CPU 15 distributes the index code data to be recorded in the RAM 16 in response to the identification signals from the data separation circuits 9 and 11. For example, the CPU performs the control operation so that the index code data corresponding to the recorded contents of the CD area 2 are recorded in the area M1 and the recorded contents of the video area 3 are recorded in the area M2. By this operation, in the playback of a recording disc in which information is recorded in both of the CD area and the video area 3, data will be recorded in alternative way in the memory areas M1 and M2 of the RAM 16.

At the time of playing of a disc, directions of such information as areas to be played back and functions to be performed are input from an operating part 17 and the data is transmitted to the CPU 15. In accordance with the designated information, the CPU 15 selects one of the areas M1 and M2 of the RAM 16, and in turn reads information necessary for executing the designated functions from the selected memory area M1 or M2. In accordance with data read in this way, the CPU 15 transmits various control signals to such parts as a tracking drive circuit 18 for driving the tracking actuator in the pickup 5, and a slider driving circuit 20 which drives and controls a slider motor 19 operating as a drive power source for moving the pickup 5 in the radial direction of the disc.

Referring to the flowchart of FIG. 7, the procedure executed by the CPU 15 will be explained.

At first, the reading of the index code data in the lead-in area is executed at a step S1 before the start of the playback. The CPU 15 then determines whether or not the read-out index codes relate to the record contents of the CD area 2 at a step S2. The judgement is performed by using the identification information contained in the read-out index code (for example, "1" for the CD area 2, and "4" for the video area 3). If the read-out index code data is of the CD area 2, the read-out data is stored in the memory area M1 of the RAM 16 at a step S3. Subsequently, the next index code data is read at a step S4, and whether or not the read-out data relates to the contents recorded in the CD area 2 is judged at a step S5. If the read-out data is data relating to the information recorded in the video area (the second index code group), the data is recorded in the memory area M2 of the RAM 16 at a step S6. Subsequently, judgements are performed as to whether or not the reading of the first index code group is completed and whether or not the reading of the second index code group is completed, at steps S7 and S8 respectively. If any of the reading operation is not completed, the program goes back to the step S1 and repeats the above described operations until both of the completion of the reading of the first and second index code groups are judged at the steps S7 and S8.

When the reading of the index code data of the first and second index code groups are all completed, whether or not the playback operation is completed is judged at a step S9. If the playback operation is not completed, the designated playback area is judged at a step S10.

When the playback of the CD area is designated, the playback operation of the CD area will be executed at a step S11, and the playback operation of the video area will be executed at a step S12 if the playback of the video area is designated. After these operations, the program goes back to the step S9. If the completion is judged at the step S9, the playback operational sequence will be terminated.

If, at the step S5, the read data are judged to be data relating to the CD area, it means that the index codes of the first index code group are memorized in succession. Since this type of disc carries information only in the CD area, the playback operation is performed in such a manner that the index code data are read-out to the last part of the first index code group and the read-out data are in turn stored in the memory area M1 of the RAM 16 at steps S13 and S14, and the playback of the CD area 2 is executed at a step S15 after the index code data have been read-out.

Conversely, if the read-out data are detected to be the data of the video area at the step S2, the read-out data are stored in the memory area M2 of the RAM 16 at a step S17, then the next index code are read-out at a step S18, and whether or not the read-out data relative to the recorded contents of the CD area 2 is judged at a step S19.

If a result of the judgement indicates that the read-out data is of the CD area, the data will be stored in the memory area M1 of the RAM 16 at a step S19. Then, the program proceeds to the step S7.

If, at the step S19, the read-out data are judged to be data relating to the video area, it means that the index codes of the second index code group are memorized in succession. Since this type of disc carries information only in the video area, the playback operation is performed in such a manner that the index code data are read-out to the last part of the second index code group and the read-out data are in turn stored in the memory area M2 of the RAM 16 at steps S21 and S22, and the playback of the video area 3 is executed at a step S23 after the index code data have been read-out.

It will be appreciated from the foregoing description, the disc type can be judged immediately by recording, in alternative way, the index codes which relate to the recorded contents of the CD area 2 and the video area 3 respectively, and include identification information indicating the recording area in which themselves belong. Particularly, by simply reviewing a few number of read-out index codes before the start of the playback operation, it becomes possible to immediately determine the type of the recording disc i.e., whether the disc to be played back is a disc which carries information only in the CD area, or a disc which carries information only in the video area, or a disc which carries information in both of the CD and video areas.

Therefore, time period required for the player to read the index codes can be limited to be in a certain constant time period irrespectively of the length of each index code. Furthermore, with discs which carry information only in a single recording area thereof, such a recording state can be judged quickly.

Moreover, the index code data read out before the playback of information are classified and stored in the memory area corresponding to the playback (recording) area to which the read-out index codes belong. At the time of playback, the memory area corresponding to the playback area is selected, and the playback operation is controlled on the basis of the stored data. Therefore, when a special playback operation is to be performed in accordance with a designation from the outside (for example by an operator through a control board of the system), the addresses of the index code data corresponding to the designated playback operation in the memory can be derived and the designated special playback operation can be executed immediately by reading out the contents of the memory. In this case, the data to be used for the desired process can be reached after a short time calculation since the extent of the memory areas in the RAM and the division in each memory area are determined previously.

In view of the foregoing, it will be appreciated according to the present invention, different sorts of index codes corresponding to the contents of each recording area and including identification information indicating the recording area to which the index code itself belongs are recorded in each lead-in area of the recording disc so that the index codes of different sorts are mixed with each other. Therefore, at the playing of the disc, the type of the disc to be played can be judged immediately by reviewing a few of index codes which have been read out. This means the time required for the player to read the index codes can be limited within a certain constant time period irrespectively of the length of each index code. Thus, the player can start the subsequent playing operation within a reasonably short time.

Furthermore, according to the playing method of the present invention, at the time of the playing of a recording disc which includes two recording areas in a single plane and in which index codes of two sorts are recorded mixedly in the lead-in area of each recording area, the index code data read out from the disc are classified and stored in the memory areas of the memory device each corresponding to the recording area to which each index code data belongs. Therefore, during the playback of the recorded information, the memory area corresponding to the recording area of the disc to be played is selected and the playing operation is controlled in accordance with the data stored in the memory area. By this feature, the special playback operations are enabled not only within each recording area but also through the two recording areas as a whole. Moreover, since the recording areas of different sorts of index codes are determined beforehand, the index code data are stored and retrieved to and from the memory device within relatively short time periods. Therefore, the rise-up time of the playing operation of the disc player and the time required for the special playback operation are also shortened.

What is claimed is:

1. An information recording disc, comprising first and second recording areas in one surface thereof, only a digital signal being recorded in said first recording area and a frequency modulated video signal and a digital signal superimposed on said frequency modulated video signal being recorded in said second recording area, said first and second recording areas respectively having a lead-in area in which first and second index code groups respectively made up of index codes relating to information recorded in corresponding one of said first and second recording areas are recorded, wherein each of said index codes of said first and second index code groups includes identification information indicating the recording area to which the index code itself belongs, and wherein said index codes of said first and second index code groups are mixed with each other in each lead-in area of said first and second recording areas.

2. An information recording disc as set forth in claim 1, wherein said index codes of said first index code group and said index codes of said second index code group are arranged in alternate way in each of said lead-in areas.

3. A method for playing an information recording disc which includes first and second recording areas in one surface thereof, only a digital signal being recorded in said first recording area and a frequency modulated video signal and a digital signal superimposed on said frequency modulated video signal being recorded in said second recording area, said first and second recording areas respectively having a lead-in area in which first and second index code groups respectively made up of index codes relating to information recorded in corresponding one of said first and second recording areas, wherein each of said index codes of said first and second index code groups includes identification information indicating the recording area to which the index code itself belongs, and wherein said index codes of said first and second index code groups are mixed with each other in each lead-in area of said first and second recording areas, said playing method comprising:

a step for reading from said lead-in area said index codes of said first and second index code groups;

a step for storing said index codes of said first index code group in a first memory area of a memory device;

a step for storing said index codes of said second index code group in a second memory area of said memory device;

a step for selecting one of said first and second memory areas and retrieving said index codes stored in the selected memory area, for playing back information recorded on said recording disc, in accordance with a designation of the recording area to be played; and a step for controlling a playback operation for playing back information recorded in said designated recorded area by using index codes retrieved from said selected memory areas.

4. An information recording disc, comprising first and second recording areas in one surface thereof for recording a plurality of selections of information, only a digital signal being recorded in said first recording area and a frequency modulated video signal and digital signal superimposed on said frequency modulated video signal being recorded in said second recording area, said first and second recording areas respectively having a lead-in area in which first and second index code groups respectively made up of index codes relating to information recorded in corresponding one of said first and second recording areas are recorded, wherein each of said index codes of said first and second index code groups includes identification information indicating the recording area to which the index code itself belongs, and wherein said index codes of said first and second index code groups are mixed with each other in each lead-in area of said first and second recording areas, and wherein said first and second index code groups contain information related to length of time parameters of said plurality of selection of information recorded in said recording areas.

* * * * *